United States Patent
Wu et al.

(10) Patent No.: US 7,885,497 B2
(45) Date of Patent: Feb. 8, 2011

(54) TFT ARRAY SUBSTRATE WITH STORAGE CAPACITOR HAVING LARGE CAPACITANCE AND LCD PANEL USING THE SAME

(75) Inventors: Tian-Yi Wu, Shenzhen (CN); Kai Meng, Shenzhen (CN)

(73) Assignees: Innocom Technology (Shenzhen) Co., Ltd., Shenzhen, Guangdong Province (CN); Chimel Innolux Corporation, Miao-Li County (TW)

( * ) Notice: Subject to any disclaimer, the term of this patent is extended or adjusted under 35 U.S.C. 154(b) by 428 days.

(21) Appl. No.: 11/811,508

(22) Filed: Jun. 11, 2007

(65) Prior Publication Data

US 2007/0285590 A1 Dec. 13, 2007

(30) Foreign Application Priority Data

Jun. 9, 2006 (CN) .................... 2006 1 0061064

(51) Int. Cl.
*G02F 1/1343* (2006.01)

(52) U.S. Cl. ........................................ 385/39
(58) Field of Classification Search ........... 349/38, 349/143, 39
See application file for complete search history.

(56) References Cited

U.S. PATENT DOCUMENTS

| 6,493,046 | B1 * | 12/2002 | Ueda .................... 349/38 |
| 7,209,192 | B2 | 4/2007 | Lee et al. |
| 2004/0212761 | A1 | 10/2004 | Kadotani et al. |
| 2007/0030432 | A1 * | 2/2007 | Chen et al. ............. 349/141 |

FOREIGN PATENT DOCUMENTS

TW 594120 B 6/2004

* cited by examiner

*Primary Examiner*—Jerry T Rahll
(74) *Attorney, Agent, or Firm*—Wei Te Chung

(57) ABSTRACT

An exemplary thin film transistor array substrate (200) includes a transparent substrate (261), a plurality of gate lines (201) and a plurality of data lines (202) formed at the transparent substrate, the gate lines and the data lines crossing each other thereby defining a plurality of pixel regions (230). Each of the pixel regions includes a storage capacitor (220). The storage capacitor includes a first capacitor and a second capacitor aligned along a direction generally perpendicular to the transparent substrate, and the first capacitor and the second capacitor are electrically connected in parallel.

19 Claims, 4 Drawing Sheets

TFT ARRAY SUBSTRATE WITH STORAGE CAPACITOR HAVING LARGE CAPACITANCE AND LCD PANEL USING THE SAME

FIELD OF THE INVENTION

The present invention relates to thin film transistor (TFT) array substrates and liquid crystal display (LCD) panels, and particularly to a TFT array substrate with storage capacitors having large capacitance and an LCD panel using the TFT array substrate.

BACKGROUND

A typical LCD is capable of displaying a clear and sharp image through thousands or even millions of pixels that make up the complete image. The LCD has thus been applied to various electronic equipments in which messages or pictures need to be displayed, such as mobile phones and notebook computers. An LCD panel is a major component of the LCD. The LCD panel generally includes a TFT array substrate, a color filter (CF) substrate opposite to the TFT array substrate, and a liquid crystal layer sandwiched between the two substrates.

FIG. 4 shows part of a typical TFT array substrate 10. FIG. 5 is an enlarged, cross-sectional view of part of the TFT array substrate 10, corresponding to line V-V of FIG. 4.

The TFT array substrate 10 includes a multiplicity of data lines 110 arranged parallel to each other and extending in a same direction, and a multiplicity of gate lines 100 arranged parallel to each other and extending in a direction perpendicular to the data lines 110. Thereby, the data lines 110 and gate lines 100 cooperatively define a multiplicity of pixel regions 180. Each of the pixel regions 180 includes a pixel electrode 140, a TFT 130 arranged at an intersection of a corresponding one of the data lines 110 and a corresponding one of the gate lines 100, a common electrode line 120 parallel to the gate line 100 and being partly overlapped by the pixel electrode 140, and an insulating layer 160 between the pixel electrode 140 and the common electrode line 120.

The TFT 130 includes a gate electrode 131 connected to the gate line 100 for receiving voltage control signals therefrom, a source electrode 132 connected to the data line 110 for receiving display signals therefrom, and a drain electrode 133 connected to the pixel electrode 140 for providing display signals thereto.

The overlapping portion of the pixel electrode 140, the insulating layer 160, and the common electrode line 120 cooperatively form a storage capacitor 150. It is important that the storage capacitor 150 have a larger capacitance for proper displaying of images. In order to display images better, there are two conventional ways for enlarging the capacitance of the storage capacitor 150: enlarging the area of the common electrode line 120, and reducing the thickness of the insulating layer 160. However, an enlarged area of the storage capacitor 150 decreases the aperture ratio of the LCD panel installed with the TFT array substrate 10. Further, the insulating layer 160 cannot be made very thin due to inherent limitations in manufacturing technology.

Accordingly, what is needed is a TFT array substrate for an LCD panel that can overcome the above-described deficiencies.

SUMMARY

In one preferred embodiment, a thin film transistor array substrate includes a transparent substrate, a plurality of gate lines and a plurality of data lines formed at the transparent substrate, the gate lines and the data lines crossing each other thereby defining a plurality of pixel regions. Each of the pixel regions includes a storage capacitor. The storage capacitor includes a first capacitor and a second capacitor aligned along a direction generally perpendicular to the transparent substrate, and the first capacitor and the second capacitor are electrically connected in parallel.

In an alternative embodiment, a liquid crystal display panel includes a color filter substrate and a thin film transistor array substrate opposite to each other, and a liquid crystal layer sandwiched between the color filter substrate and thin film transistor array substrates. The thin film transistor array substrate includes a transparent substrate, a plurality of gate lines and a plurality of data lines formed at the transparent substrate, the gate lines and the data lines crossing each other thereby defining a plurality of pixel regions. Each of the pixel regions includes a storage capacitor. The storage capacitor includes a first capacitor and a second capacitor aligned along a direction generally perpendicular to the transparent substrate, and the first capacitor and the second capacitor are electrically connected in parallel.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
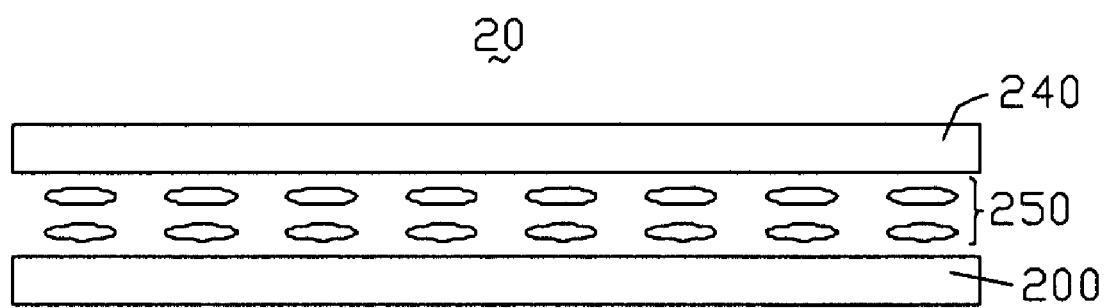
FIG. 1 a side view of an LCD panel according to a preferred embodiment of the present invention.

FIG. 1 is a schematic, side view of an LCD panel according to a preferred embodiment of the present invention. The LCD panel 20 includes a thin film transistor (TFT) array substrate 200, a color filter (CF) substrate 240 disposed generally opposite to the TFT array substrate 200 with a predetermined distance therebetween, and a liquid crystal layer 250 interposed between the TFT array substrate 200 and the CF substrate 240.

Figure 2:
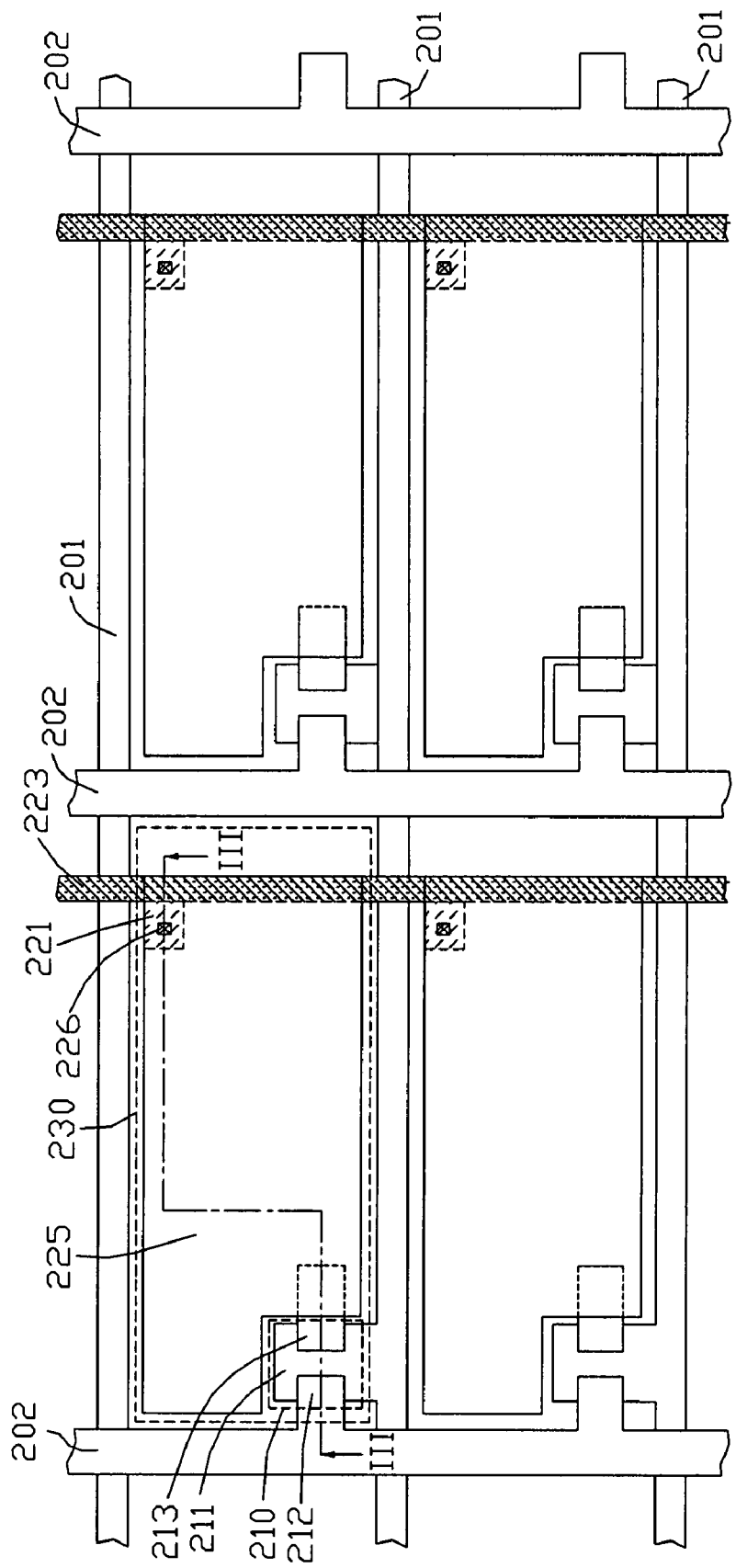
FIG. 2 is an enlarged, top plan view of part of a TFT array substrate of the LCD panel of FIG. 1.

Also referring to FIG. 2, this is an enlarged, top plan view of part of the TFT array substrate 200. A plurality of data lines 202 and gate lines 201 are formed on the TFT array substrate 200. The data lines 202 are arranged parallel to each other and extend along a longitudinal direction. The gate lines 201 are arranged parallel to each other and extend along a direction transverse to the data lines 202. Thus, the crossing data lines 202 and gate lines 201, cooperatively, define a multiplicity of pixel regions 230. Each of the pixel regions 230 has a rectangular shape having a long side and a short side, wherein the short side is parallel to the data lines 202.

Each pixel region 230 includes a thin film transistor (TFT) 210 arranged at an intersection of a corresponding one of the data lines 202 and a corresponding one of the gate lines 201, a pixel electrode 225, a common electrode line 223 parallel to the data lines 202, a capacitor electrode 221 partly overlapped by the common electrode line 223, and a contact hole 226 spanning between the pixel electrode 225 and the capacitor electrode 221. All of the common electrode lines 223 can be connected together at corresponding same ends thereof, in order to receive common voltage signals for displaying images.

The TFT 210 includes a gate electrode 211 connected to the gate line 201 for receiving voltage control signals therefrom, a source electrode 212 connected to the data line 202 for receiving display signals therefrom, and a drain electrode 213 connected to the pixel electrode 225 for providing display signals thereto. When a voltage control signal is provided to the gate electrode 211 via the gate line 201 to turn on the TFT 210, the display signals are provided to the pixel electrode 225 from the data line 202 via the source electrode 212 and drain electrode 213.

Figure 3:
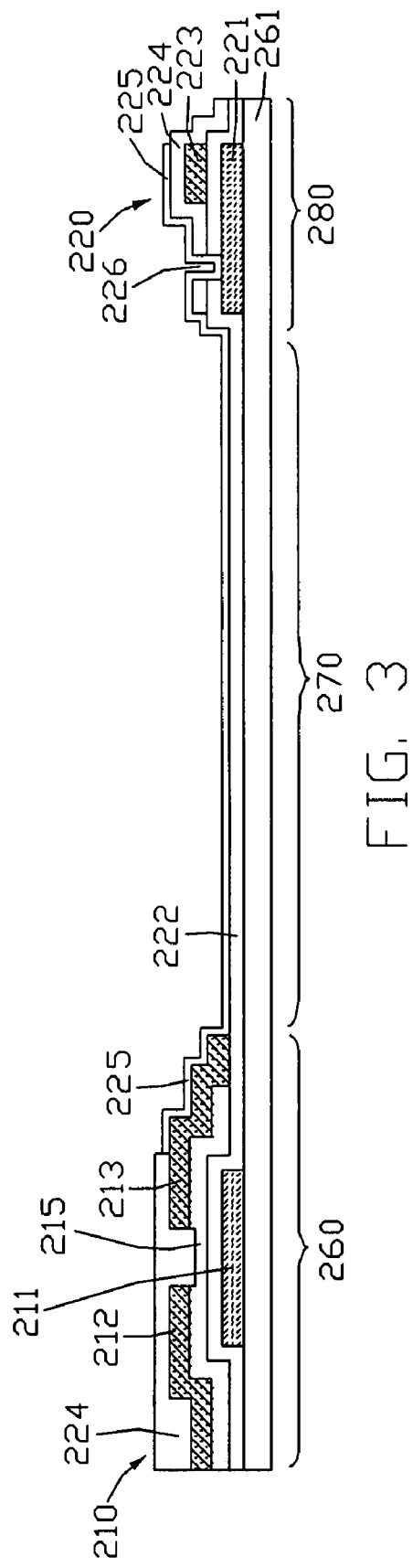
FIG. 3 is an enlarged, cross-sectional view of part of the TFT array substrate of FIG. 2, corresponding to line III-III thereof.
Figure 4:
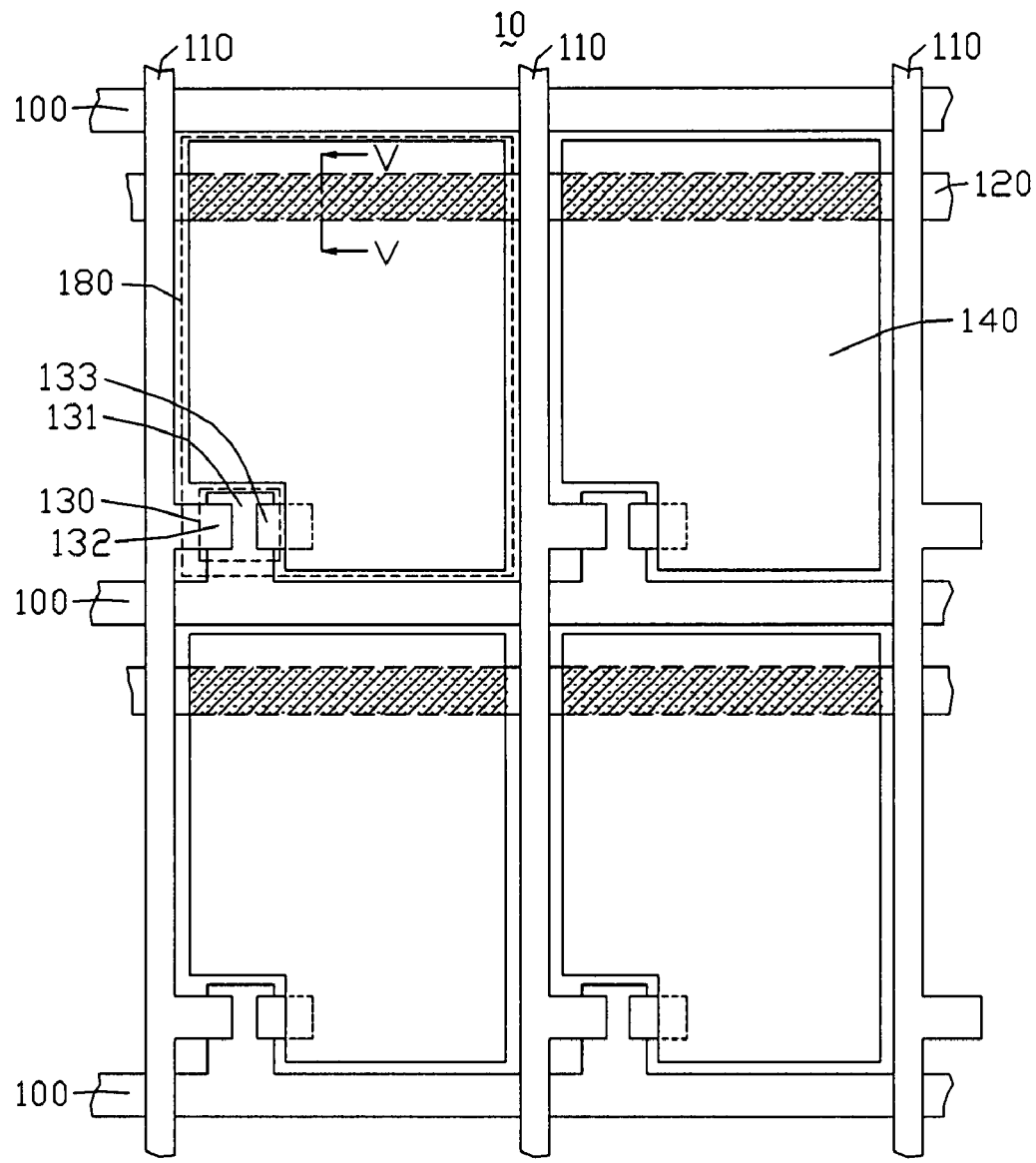
FIG. 4 is a top plan view of part of a TFT substrate of a conventional LCD panel.
Figure 5:
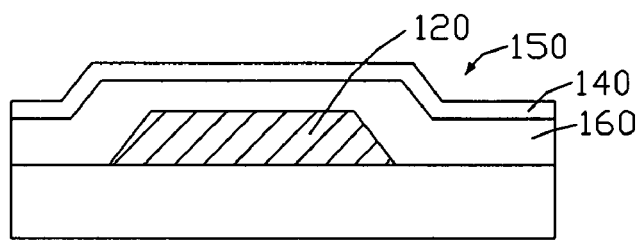
FIG. 5 is an enlarged, cross-sectional view of part of the TFT array substrate of FIG. 4, corresponding to line V-V thereof.

Also referring to the FIG. 3, this is an enlarged, cross-sectional view of part of the TFT array substrate 200, corresponding to line III-III of FIG. 2. Each of the pixel regions 230 includes three sub-regions: a TFT sub-region 260 corresponding to the TFT 210, a storage capacitor sub-region 280 corresponding to a storage capacitor 220, and a display sub-region 270 between the TFT sub-region 260 and the storage capacitor sub-region 280.

The TFT array substrate 200 further includes a transparent substrate 261, a first insulating layer 222, a doped silicon layer 215, and a second insulating layer 224.

The gate electrode 211 and the capacitor electrode 221 are formed at a same layer on the transparent substrate 261. The first insulating layer 222 is formed on the transparent substrate 261, and covers the gate line 211, the display sub-region 270, and the capacitor electrode 221. The doped silicon layer 215 is disposed on the first insulating layer 222 above and around the gate electrode 211. The source electrode 212 and the drain electrode 213 are formed on two ends of the doped silicon layer 215, and are symmetrically opposite each other. The common electrode line 223 is formed on the first insulating layer 222 above the capacitor electrode 221. The source electrode 212, the drain electrode 213, and the common electrode line 223 can be formed at a same layer above the transparent substrate 261. The second insulating layer 224 is formed on the source electrode 212, the doped silicon layer 215, and a portion of the drain electrode 213, and on and around the common electrode line 223. The pixel electrode 225 covers a portion of the drain electrode 213, the first insulating layer 222 at the display sub-region 270, and the part of the second insulating layer 224 covering the common electrode line 223. The pixel electrode 225 is electrically connected to the capacitor electrode 221 via the contact hole 226, which passes through the second insulating layer 224 and the first insulating layer 222. In particular, the contact hole 226 contains a portion of the pixel electrode 225, which electrically connects with the capacitor electrode 221.

The capacitor electrode 221, the first insulating layer 222, and the common electrode line 223 cooperatively form a first capacitor. The common electrode line 223, the second insulating layer 224, and the pixel electrode 225 above the common electrode line 223 cooperatively form a second capacitor. The first capacitor and the second capacitor share the same common electrode line 223 as one of their capacitor electrodes. The pixel electrode 225 and the capacitor electrode 221 are electrically connected with each other via the contact hole 226. Therefore the first and second capacitors are electrically connected in parallel, and cooperatively form a single storage capacitor having a larger amount of capacitance to store a display voltage.

The above-described configuration provides an enlarged capacitance of the storage capacitor without expanding an area of the storage capacitor which overlies the transparent substrate 261. This ensures that the LCD panel 20 can display images better, while keeping an aperture ratio of the LCD panel 20 as high as possible.

Moreover, in the above-described configuration, the common electrode line 223 is parallel to the short side of the pixel region 230. Therefore the storage capacitor 220 formed by part of the common electrode line 223 occupies a relatively small area of the pixel region 230. This configuration also helps ensure that the LCD panel 20 has a high aperture ratio.

Furthermore, all of the common electrode lines 223 of the LCD panel 20 can be connected together at corresponding same ends thereof, in order to receive common voltage signals for displaying images. This configuration makes it easier and more convenient to manufacture the LCD panel 20.

It is to be further understood that even though numerous characteristics and advantages of various embodiments have been set forth in the foregoing description, together with details of the structures and functions of the embodiments, the disclosure is illustrative only, and changes may be made in detail to the full extent indicated by the broad general meaning of the terms in which the appended claims are expressed.

What is claimed is:

1. A thin film transistor array substrate, comprising:
   a transparent substrate; and
   a plurality of gate lines and a plurality of data lines formed at the transparent substrate, the gate lines and the data lines crossing each other thereby defining a plurality of pixel regions;
   wherein each of the pixel regions comprises a storage capacitor, the storage capacitor comprises a first capacitor and a second capacitor aligned along a direction generally perpendicular to the transparent substrate, the first capacitor and the second capacitor are electrically connected in parallel, the first capacitor comprises a capacitor electrode, a common electrode line parallel to the capacitor electrode, and a first insulating layer sandwiched between the capacitor electrode and the common electrode line, and the second capacitor comprises the common electrode line, a pixel electrode parallel to the common electrode line, and a second insulating layer sandwiched between the common electrode line and the pixel electrode.

2. The thin film transistor array substrate as claimed in claim 1, wherein the pixel electrode is electrically connected to the capacitor electrode.

3. The thin film transistor array substrate as claimed in claim 2, wherein each of the pixel regions further comprises a contact hole passing through the first insulating layer and the second insulating layer, and the pixel electrode is electrically connected to the capacitor electrode via the contact hole.

4. The thin film transistor array substrate as claimed in claim 1, wherein each of the pixel regions has a rectangular shape with a long side and a short side, and the common electrode line is parallel to the short side.

5. The thin film transistor array substrate as claimed in claim 1, wherein each of the pixel regions further comprises a thin film transistor arranged at an intersection of a corresponding one of the gate lines and a corresponding one of the data lines.

6. The thin film transistor array substrate as claimed in claim 5, wherein the thin film transistor comprises a gate electrode electrically connected to the corresponding one of the gate lines, a source electrode electrically connected to the corresponding one of the data lines, and a drain electrode electrically connected to a corresponding storage capacitor.

7. The thin film transistor array substrate as claimed in claim 6, wherein the common electrode line is formed at a same layer with the data electrode and the gate electrode.

8. The thin film transistor array substrate as claimed in claim 6, wherein the capacitor electrode is formed at a same layer with the gate electrode.

9. A liquid crystal display panel, comprising:
a color filter substrate and a thin film transistor array substrate generally opposite to each other; and
a liquid crystal layer sandwiched between the color filter substrate and the thin film transistor array substrate;
wherein the thin film transistor array substrate comprises:
a transparent substrate; and
a plurality of gate lines and a plurality of data lines formed at the transparent substrate, the gate lines and the data lines crossing each other thereby defining a plurality of pixel regions;
each of the pixel regions comprising a storage capacitor, the storage capacitor comprising a first capacitor and a second capacitor aligned along a direction generally perpendicular to the transparent substrate, and the first capacitor and the second capacitor being electrically connected in parallel, wherein the first capacitor comprises a capacitor electrode, a common electrode line parallel to the capacitor electrode, and a first insulating layer sandwiched between the capacitor electrode and the common electrode line, and the second capacitor comprises the common electrode line, a pixel electrode parallel to the common electrode line, and a second insulating layer sandwiched between the common electrode line and the pixel electrode.

10. The liquid crystal display panel as claimed in claim 9, wherein each of the pixel regions further comprises a thin film transistor arranged at an intersection of a corresponding one of the gate lines and a corresponding one of the data lines.

11. The liquid crystal display panel as claimed in claim 10, wherein the thin film transistor comprises a gate electrode electrically connected to the corresponding one of the gate lines, a source electrode electrically connected to the corresponding one of the data lines, and a drain electrode electrically connected to a corresponding storage capacitor.

12. The liquid crystal display panel as claimed in claim 9, wherein the pixel electrode is electrically connected to the capacitor electrode.

13. The liquid crystal display panel as claimed in claim 12, wherein each of the pixel regions further comprises a contact hole passing through the first insulating layer and the second insulating layer, and the pixel electrode is electrically connected to the capacitor electrode via the contact hole.

14. The liquid crystal display panel as claimed in claim 9, wherein each of the pixel regions has a rectangular shape with a long side and a short side, and the common electrode line is parallel to the short side.

15. A thin film transistor array substrate, comprising:
a transparent substrate; and
a plurality of gate lines and a plurality of data lines formed at the transparent substrate, the gate lines and the data lines crossing each other thereby defining a plurality of pixel regions, each of the pixel regions having a rectangular shape with a long side and a short side;
wherein each of the pixel regions comprises a storage capacitor, the storage capacitor comprises a first capacitor and a second capacitor aligned along a direction generally perpendicular to the transparent substrate, and the first capacitor and the second capacitor are electrically connected in parallel; and
wherein the second capacitor comprises a common electrode line, a pixel electrode facing toward the common electrode line, and an insulating layer sandwiched between the common electrode line and the pixel electrode, and the common electrode line is parallel to the short side.

16. The thin film transistor array substrate as claimed in claim 15, wherein each of the pixel regions further comprises a thin film transistor arranged at an intersection of a corresponding one of the gate lines and a corresponding one of the data lines, and each thin film transistor comprises a gate electrode electrically connected to the corresponding one of the gate lines, a source electrode electrically connected to the corresponding one of the data lines, and a drain electrode electrically connected to a corresponding storage capacitor.

17. The thin film transistor array substrate as claimed in claim 16, wherein the common electrode line is formed at a same layer with the data electrode and the gate electrode.

18. The thin film transistor array substrate as claimed in claim 16, wherein in each pixel region, the first capacitor and the second capacitor share a same common electrode line.

19. The thin film transistor array substrate as claimed in claim 18, wherein the first capacitor comprises a capacitor electrode facing towards the common electrode line, and the capacitor electrode is formed at a same layer with the gate electrode.

* * * * *

UNITED STATES PATENT AND TRADEMARK OFFICE
CERTIFICATE OF CORRECTION

PATENT NO. : 7,885,497 B2  
APPLICATION NO. : 11/811508  
DATED : February 8, 2011  
INVENTOR(S) : Tian-Yi Wu and Kai Meng It is certified that error appears in the above-identified patent and that said Letters Patent is hereby corrected as shown below:

Title Page;  
Please replace Section (73) regarding "Assignees" on the front page of the Patent with the following:

(73) Assignees: Innocom Technology (Shenzhen) Co., Ltd., Shenzhen, Guangdong Province (CN); Chimei Innolux Corporation, Miao-Li County (TW).

Signed and Sealed this  
Seventh Day of June, 2011

David J. Kappos  
*Director of the United States Patent and Trademark Office*